(12) United States Patent
Bilik et al.

(10) Patent No.: US 10,473,759 B2
(45) Date of Patent: Nov. 12, 2019

(54) TOOL FOR AUTOMATIC MULTIPLE RADAR CALIBRATION

(71) Applicant: GM GLOBAL TECHNOLOGY OPERATIONS LLC, Detroit, MI (US)

(72) Inventors: Igal Bilik, Rehovot (IL); Alexander Pokrass, Bat Yam (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 408 days.

(21) Appl. No.: 15/471,413

(22) Filed: Mar. 28, 2017

(65) Prior Publication Data
US 2018/0284220 A1    Oct. 4, 2018

(51) Int. Cl.
| | | |
|---|---|---|
| *G01S 7/40* | (2006.01) | |
| *G01S 13/00* | (2006.01) | |
| *G01S 13/46* | (2006.01) | |
| *G01S 13/87* | (2006.01) | |
| *G01S 13/93* | (2006.01) | |
| *G01S 15/87* | (2006.01) | |

(52) U.S. Cl.
CPC .............. *G01S 7/40* (2013.01); *G01S 13/003* (2013.01); *G01S 13/46* (2013.01); *G01S 13/876* (2013.01); *G01S 13/878* (2013.01); *G01S 13/931* (2013.01); *G01S 15/878* (2013.01); *G01S 2007/4086* (2013.01); *G01S 2013/466* (2013.01)

(58) Field of Classification Search
CPC ........ G01S 7/40; G01S 7/4008; G01S 7/4021; G01S 7/4026; G01S 13/003; G01S 13/46; G01S 2013/466; G01S 2013/468; G01S 13/876; G01S 13/878; G01S 13/931
See application file for complete search history.

(56) References Cited

U.S. PATENT DOCUMENTS

| | | | | |
|---|---|---|---|---|
| 5,534,873 A * | 7/1996 | Weichman | .............. | G01S 7/411 342/165 |
| 5,872,536 A * | 2/1999 | Lyons | .................. | B60R 21/013 342/107 |
| 5,964,822 A * | 10/1999 | Alland | .................. | G01S 7/4004 342/90 |
| 6,087,928 A * | 7/2000 | Kleinberg | .............. | B60Q 9/008 340/435 |
| 6,628,227 B1 * | 9/2003 | Rao | ........................ | G01S 13/931 342/70 |
| 7,369,941 B2 * | 5/2008 | Schiffmann | ........... | G01S 13/878 340/435 |

(Continued)

*Primary Examiner* — Peter M Bythrow
(74) *Attorney, Agent, or Firm* — Cantor Colburn LLP

(57) ABSTRACT

A method and apparatus for determining a distance between a first radar system disposed on a vehicle and a second radar system disposed on the vehicle. A target reflector is moved along a track to a location along a perpendicular bisector of a baseline connecting the first radar system and the second radar system. A direct range measurement is obtained for at least one of the first radar system and the second radar system, and a bistatic range measurement is obtained between the first radar system and the second radar system. A processor determines the distance between the first radar system and the second radar system using the direct range measurement, the bistatic range measurement and a radial length of the target reflector.

20 Claims, 3 Drawing Sheets

(56) References Cited

U.S. PATENT DOCUMENTS

| | | | | |
|---|---|---|---|---|
| 7,474,256 | B2* | 1/2009 | Ohta | G01S 17/48 |
| | | | | 342/146 |
| 7,806,249 | B2* | 10/2010 | Kolmhofer | G01S 7/4026 |
| | | | | 198/418 |
| 8,120,526 | B2* | 2/2012 | Holder | G01S 13/003 |
| | | | | 342/139 |
| 9,507,023 | B2* | 11/2016 | Nakano | G08G 1/166 |
| 2005/0060117 | A1* | 3/2005 | Kunzler | G01S 13/586 |
| | | | | 702/149 |
| 2014/0259707 | A1* | 9/2014 | Jones | G01S 7/4026 |
| | | | | 33/228 |

* cited by examiner

TOOL FOR AUTOMATIC MULTIPLE RADAR CALIBRATION

INTRODUCTION

The subject disclosure relates to calibrating multiple radar systems and, in particular, to a device and method for determining distance between a first radar system and a second radar system in order to use the first radar system and second radar system cooperatively.

Vehicular tracking systems include radar systems (i.e., radar transmitters and receivers) that sense objects in the environment of the vehicle as well as various parameters related to an object, such as its distance to the vehicle and its velocity relative to the vehicle. Some vehicular tracking systems include multiple radars located at different locations of the vehicle. These multiple radars can be used as a bistatic radar system in which a radar signal is transmitted from a transmitter at one location and a reflection of the radar signal from the object is received at another location. Such bistatic radar measurements are used to determine parameters of the object using knowledge of the distance between the transmitter and receiver. However, such distances are not well known for radar systems that are integrated into the non-planar surfaces of a vehicle. Additionally, obtaining knowledge of this is difficult when the radar systems are not within a direct line-of-sight of each other. Accordingly, it is desirable to provide a calibration method and device for determining a distance between radar systems integrated into a vehicle in order to provide bistatic radar capability to the vehicle.

SUMMARY

In one exemplary embodiment, a method of measuring a distance between a first radar system disposed on a vehicle and a second radar system disposed on the vehicle is disclosed. The method includes moving a target reflector along a track to a location along a perpendicular bisector of a baseline connecting the first radar system and the second radar system, and obtaining a direct range measurement for at least one of the first radar system and the second radar system and a bistatic range measurement between the first radar system and the second radar system. The distance between the first radar system and the second radar system is determined using the direct range measurement, the bistatic range measurement and a radial length of the target reflector.

The method further includes determining a radar measurement of an object based on the determined distance between the radar system and the second system. In one embodiment, the vehicle is maneuvered with respect to the object based on the determined radar measurement.

Moving the target reflector to the location along the perpendicular bisector includes moving the target reflector to the location at which a first direct range measurement between the first radar system and the target reflector is equal to or substantially equal to a second direct range measurement between the second radar system and the target reflector.

In an embodiment, the target reflector is a spherical reflector and the radial length is a radius of the spherical reflector. In another embodiment, the reflector is a reflective surface extended from the track by a radial element and the radial length is a length of the radial element. In the embodiment in which the reflector is the reflective surface, the direct range measurement is obtained with the reflective surface at one angular position and the bistatic range measurement is obtained with the reflective surface at another angular position. In various embodiments, the first radar system and the second radar system are out of a line-of-sight of each other.

In another exemplary embodiment, an apparatus for determining a distance between a first radar system disposed on a vehicle and a second radar system disposed on the vehicle is disclosed. The apparatus includes a track that is disposed parallel to a baseline of the first radar system and the second radar system and intercepts a perpendicular bisector of the baseline, a target reflector that moves along the track, and a processor coupled to the first radar system and the second radar system. The processor is configured to obtain a direct range measurement for at least one of the first radar system and the second radar system and a bistatic range measurement between the first radar system and the second radar system when the target reflector is located at an intersection of the perpendicular bisector and the track, and determine the distance between the first radar system and the second radar system using the direct range measurement, the bistatic range measurement and a radial length of the target reflector.

In an embodiment, the processor determines a radar measurement of an object based on the determined distance between the radar system and the second system. In an embodiment, the vehicle is maneuvered with respect to the object based on the determined radar measurement.

In an embodiment, the target reflector is a spherical reflector and the radial length is a radius of the spherical reflector. In another embodiment, the reflector is a reflective surface extended from a swivel point on the track by a radial element and the radial length is a length of the radial element. In an embodiment in which the reflector is the reflective surface, the reflective surface is placed at one angular position to obtain the direct range measurement and at another angular location to obtain the bistatic range measurement.

In yet another exemplary embodiment, a method of measuring a distance between a first radar system disposed on a vehicle and a second radar system disposed on the vehicle is disclosed. The method includes disposing a track parallel to a baseline connecting the first radar system and the second radar system, moving a target reflector along the track to a selected location at which the target reflector intersects the perpendicular bisector of a baseline, obtaining a direct range measurement for at least one of the first radar system and the second radar system and a bistatic range measurement between the first radar system and the second radar system, and determining the distance between the first radar system and the second radar system using the direct range measurement, the bistatic range measurement and a radial length of the target reflector.

Moving the target reflector to the selected includes determining the location at which a first direct range measurement between the first radar system and the target reflector is equal to or substantially equal to a second direct range measurement between the second radar system and the target reflector.

In an embodiment, the target reflector is a spherical reflector and the radial length is a radius of the spherical reflector. In another embodiment, the reflector is a reflective surface extended from a swivel point by a radial element and the radial length is a length of the radial element. In the embodiment in which the reflector is the reflective surface, the direct range measurement is obtained with the reflective surface at one angular position and the bistatic range measurement is obtained with the reflective surface at another angular position. In an embodiment, the first radar system and the second radar system are out of a line-of-sight of each other.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
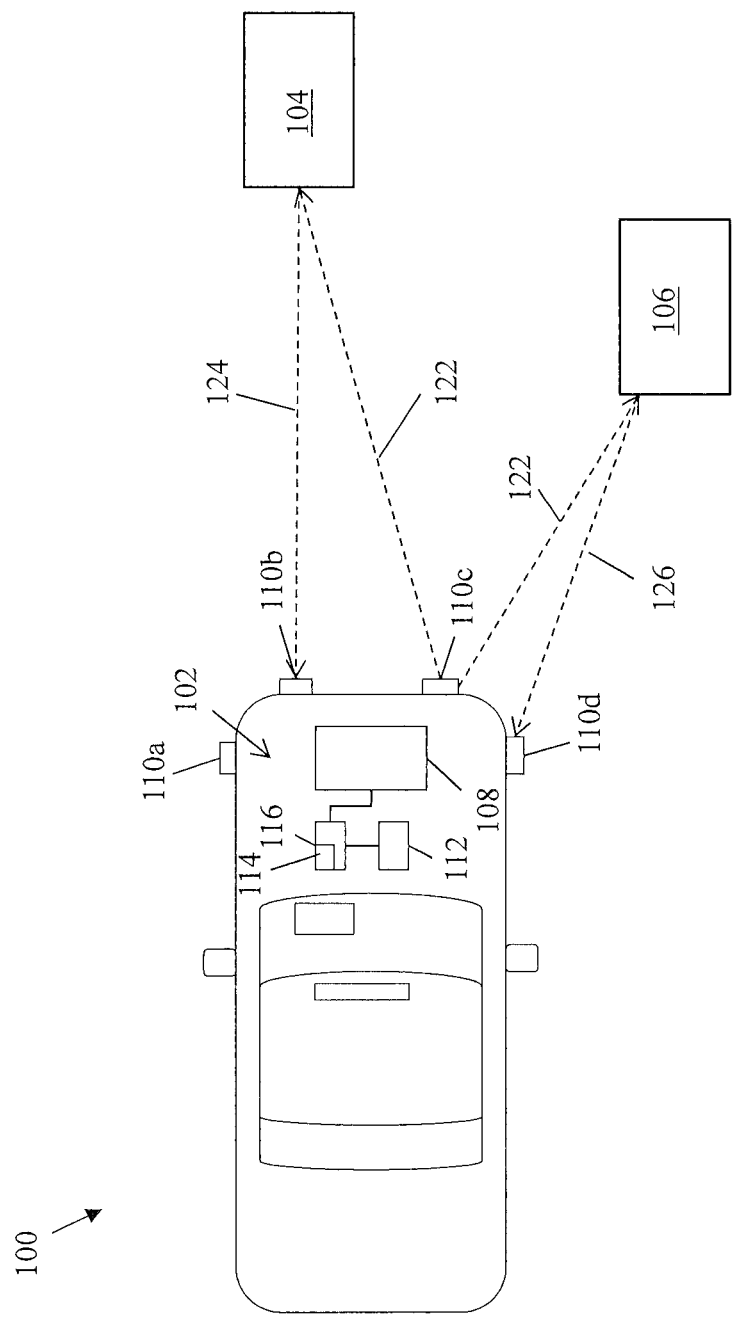
FIG. 1 shows a top view of a vehicle that includes multiple integrated radar systems suitable for driving purposes, according to an embodiment.

In accordance with an exemplary embodiment of the disclosure, FIG. 1 shows a top view of a vehicle 100 that includes multiple integrated radar systems suitable for driving purposes, according to an embodiment. The automobile in FIG. 1 operates an autonomous driving system 102 that includes a radar control system 108, a control unit 116 and a collision-avoidance system 112. The radar system operations multiple radar transducers 110a, 110b, 110c, 110d that are disposed at separate locations of the vehicle 100.

Each of the radar transducers 110a, 110b, 110c, and 110d may include at least one of a transmitter and a receiver. In one embodiment, each of the radar transducers 110a, 110b, 110c, and 110d includes both a transmitter and a receiver. The radar transducers 110a, 110b, 110c, 110d are signally connected to radar control system 108 that controls operation of the transducers 110a, 110b, 110c, 110d to transmit source signals and process received reflected signals. Each transducer 110a, 110b, 110c, 110d may independently obtain direct range measurements to various objects in its environment. Additionally or alternatively, the transducers 110a, 110b, 110c and 110d may be used to obtain bistatic range measurements. In an example of bistatic range measurement, radar control system 108 activates a transmitter of a selected transducer (e.g., transducer 110c) to transmit a radar source signal 122 outward from the vehicle 100. For illustrative purposes, the radar source signal 122 is reflected by first object 104 and second object 106. The reflected signal 124 from the first object 104 is received at transducer 110b. The reflected signal 126 from the second object 106 is received at transducer 110d. The range and Doppler frequency of the first object 104 can be determined based on knowledge of a distance between the transducer 110c and transducer 110b. Similarly, the range and Doppler frequency of the second object 106 can be determined based on knowledge of a distance between the transducer 110c and transducer 110d. Therefore, the resolution of the range and Doppler frequency measurements for the first and second objects 104 and 106 is dependent on the resolution or accuracy with which these intra-transducer distances are known.

The radar control system 108 provides radar measurement data to control unit 116. The control unit 116 may include one or more processors 114 for determining a location and/or velocity (i.e., Doppler frequency) of the first and second objects 104 and 106 from the radar measurement data and in turn provides this location and/or velocity to the collision-avoidance system 112.

The collision-avoidance system 112 obtains inputs (e.g., speed, braking rate, acceleration) of the vehicle 110 from internal components and other sensors of the vehicle 100 and uses this information along with the determined location and/or velocity of the first and second objects 104 and 106 in order to determine a path that avoids contact with the first and second objects 104 and 106. The collision-avoidance system then maneuvers the vehicle 100 along the path, thereby providing the ability of the vehicle 100 to drive safely through its environment. Alternatively, the collision-avoidance system 112 may provide an alert to a driver of the vehicle when hazardous driving conditions are imminent. Since the ability of the vehicle 100 to avoid interaction with the objects depends on the resolution of the radar measurements and since the resolution of bistatic radar measurements depends on the distances between transducers 110a, 110b, 110c, 110b, having an accurate knowledge of these distances enables the effective operation of the autonomous driving system 112.

Figure 2:
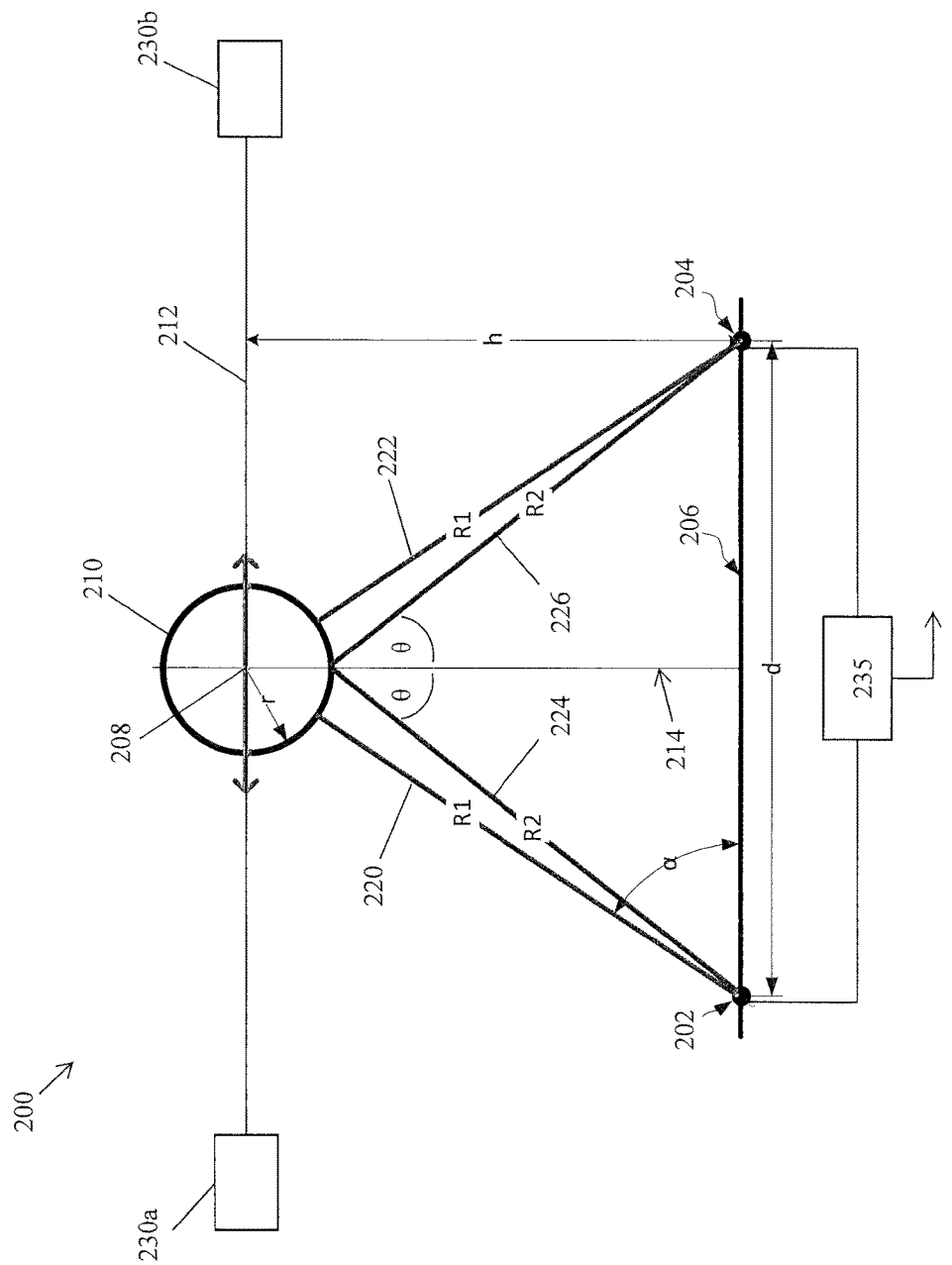
FIG. 2 illustrates a calibration device for determining a distance between a first radar system and a second radar system in an embodiment.

FIG. 2 illustrates a calibration device 200 for calibrating a first radar system 202 and a second radar system 204 by determining a distance between the first radar system 202 and the second radar system 204, in an embodiment. The first radar system 202 and second radar system 204 can be any two of the transducers 110a, 110b, 110c and 110d shown in FIG. 1 or of any equivalent transducers of the vehicle 100. The first radar system 202 is separated from the second radar system 204 along a baseline 206, which is a straight line. The distance between the first radar system 202 and the second radar system 204 is indicated as distance d. Mounts 230a and 230b are used to secure a track 212 at a selected location so that the track 212 extends parallel to the baseline 206 at a selected distance h from the baseline 206. Mounts 230a and 230b can be secured to the vehicle or to a location independent of the vehicle 100. Track 212 may be a wire, rod or other straight-line element. A target reflector 210 moves along or is conveyed along track 212. In an embodiment, the target reflector 210 is a sphere or spherical reflector having a selected radius r. The track 212 passes radially through the center 208 of the sphere, for example, via holes in the sphere. FIG. 2 shows the target reflector 210 at a location at which the center 208 of the sphere is along a perpendicular bisector 214 of the baseline 206.

The first radar system 202 includes a radar transmitter and a radar receiver. The second radar system 204 also includes a radar transmitter and a radar receiver. The first radar system 202 and the second radar system 204 are each time-synchronized and frequency-synchronized. Each of the first radar system 202 and the second radar system 204 is capable of measuring a direct range to the target reflector 210 and a bistatic range to the target reflector 210. The first radar system 202 and the second radar system 204 are in communication with processor 235. In various embodiments, processor 235 may be the same as the one or more processor 114 of FIG. 1. The processor 235 receives data from the first radar system 202 and the second radar system 204, determines various radar measurements such as direct range measurements and bistatic range measurements based on the received data, and determines the length of the baseline 206 from the determined radar measurements.

The direct range is a distance traversed by a radar signal that is transmitted from one radar system (e.g., the first radar system 202) and received after reflection from the target reflector 210 by a receiver of the same radar system (first radar system 202). The bistatic range is a distance traversed by a radar signal that is transmitted from one radar system (e.g., the first radar system 202) and received upon reflection from the target reflector 210 at a different radar system (e.g., the second radar system 204). A direct range signal of the first radar system 202 travels from the first radar system along a radial line 220 of the target reflector 210 and is reflected to retrace radial line 220 back to the first radar system 202. Similarly, a direct range signal of the second radar system 204 travels from the second radar system along radial line 222 of the target reflector 210 and is reflected to retrace radial line 222 back to the second radar system 204. The length of the radial lines 220 and 222 can be determined from time-of-flight measurements. When the center 208 of the target reflector 210 is located away from the perpendicular bisector 214 (i.e., when the perpendicular bisector 214 does not pass through the center 208 of the sphere), either radial line 220 will be greater than the radial line 222 or radial line 222 will be greater than radial line 220. When the target reflector 210 is located on the perpendicular bisector 214 (i.e., when the perpendicular bisector 214 passes through the center 208 of the sphere), the radial lines 220 and 222 are equal in length to each other. FIG. 2 shows the target reflector 210 located on the perpendicular bisector 214. Thus, the lengths of these radial lines 220 and 222 are both the same and are indicated as $R_1$.

To determine a bistatic range, a signal transmitted from one radar system (e.g., the first radar system 202) is reflected off of the target reflector 210 and received at the other radar system (e.g., the second radar system 204). The path travelled by the radar signal includes a line 224 between the first radar system 202 and the target reflector 210 and a line 226 between the target reflector 210 and the second radar system 204. When the center 208 of the sphere is located on perpendicular bisector 214, the bistatic radar signal is reflected off of the point of the sphere 210 that is closest to the baseline 206 and the length of line 224 is equal to the length of line 226. As a result, the angle between the perpendicular bisector 214 and the line 224 (labelled θ) is equal to the angle between the perpendicular bisector 214 and the line 226 (also labelled θ). Additionally, when the center 208 of the sphere is located on perpendicular bisector 214, a bistatic radar signal generated by the first radar system 202 and received by the second radar system 204 traverses a same path as a bistatic radar signal generated by the second radar system 204 and received by the first radar system 202, only in reverse.

A method for determining a distance between the first radar system 202 and the second radar system 204 or in other words, for determining the length d of baseline 206, is now discussed. Target reflector 210 moves along track 212. Direct range measurements are obtained from the target reflector 210 using both the first radar system 202 and the second radar system 204 as the target reflector 210 is moved along track 212. When the direct range measurements from first and second radar systems 202 and 204 are equal to each other, the target reflector 210 is kept in place.

Once equal direct range measurements have been obtained, bistatic measurements are obtained. A first radar signal is transmitted from the first radar system 202 to reflect off of the target reflector 210 into the second radar system 204 and a first bistatic range is measured. A second radar signal is then transmitted from the second radar system 204 to reflect off of the target reflector 210 into the first radar system 202 and a second bistatic range is measured. If the center 208 of the sphere is on the bisector, the first bistatic range measurement is equal to the second bistatic range measurement. If the first bistatic range measurement is not equal to the second bistatic range measurement, the location of the target reflector 210 can be adjusted until bistatic range measurements are equal. Lines 224 and 226 for which bistatic range measurements are equal are indicated by $R_2$.

With the target reflector 210 located so that the perpendicular bisector 214 passes through the center 208, radial line 220 is equal to radial line 222 (and both are equal to $R_1$) and line 224 is equal to line 226 (and both are equal to $R_2$). Thus, the following equations are true:

$$h = \frac{R_1^2 - R_2^2}{2r} + R_1 + r \qquad \text{Eq. (1)}$$

$$\sin(\alpha) = 1 + \frac{R_1^2 - R_2^2}{2r(R_1 + r)} \qquad \text{Eq. (2)}$$

$$d = 2(R_1 + r)\cos(\alpha) \qquad \text{Eq. (3)}$$

where r is a radial length of the target reflector 210. For the spherical reflector of FIG. 2, the radial length is the radius of the sphere.

From Eq. (1) it is clear that h can be determined from the measurements of $R_1$, $R_2$ and the selected radius r of the target reflector. Thus, it is not necessary to know the exact value of h prior to obtaining radar measurements. It is also not necessary to place the track 212 at a specific distance from the baseline 206. From Eq. (2), the measurement of angle α between radial line 220 and baseline 206 can be determined from the measurements of $R_1$, $R_2$ and the selected radius r of the target reflector. The length d of the baseline 206 can then be determined from Eqs. (1)-(3).

Figure 3:
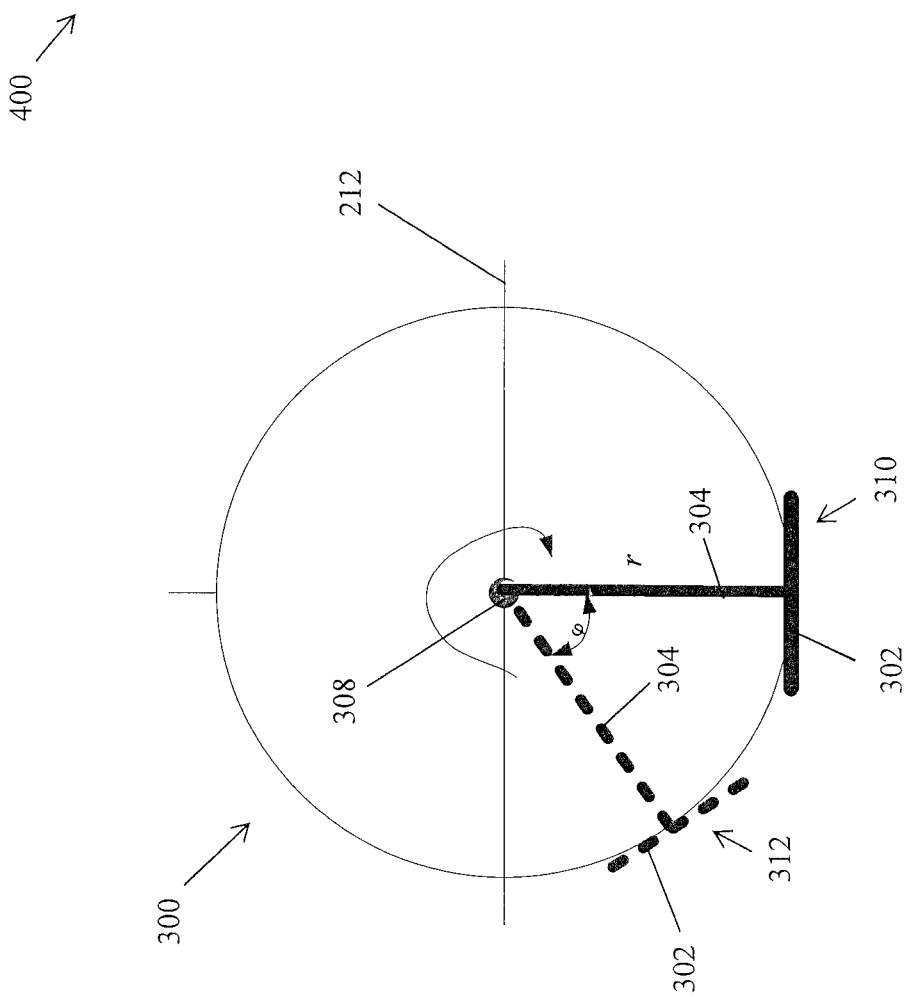
FIG. 3 shows a target reflector that includes a hinged reflective surface usable with the calibration device of FIG. 2 in an alternate embodiment.

FIG. 3 shows a target reflector 300 that includes a hinged reflective surface 302 in an alternate embodiment. The target reflector 300 includes a solid radial element 304 having a first end and a second end opposite the first end. The radial element may be a rod, for example. The first end is located at the track 212 using an attachment point 308 and is movable along track 212. A reflective surface 302 is attached to the second end of the radial element 304 and rotates about the attachment point 308. Therefore, the reflective surface 302 is disposed at a selected distance or radial length from the attachment point 308, which is the length r of the radial element 304. The reflective surface 302 can be maneuvered to any selected angle φ. The dark outline shows the reflective surface 302 at a first angular position 310 and the dashed outline shows the reflector surface 302 at a second angular position 312. Comparing FIG. 3 to FIG. 2, at the first position 310 the reflective surface 302 is arranged for reflection of bistatic radar measurements, and at the second position 312 the reflective surface 302 is arranged for reflection of a range radar measurement. The reflective surface 302 can be rotated about the attachment point 308 in order to provide both range radar measurements and bistatic radar measurements.

Figure 4:
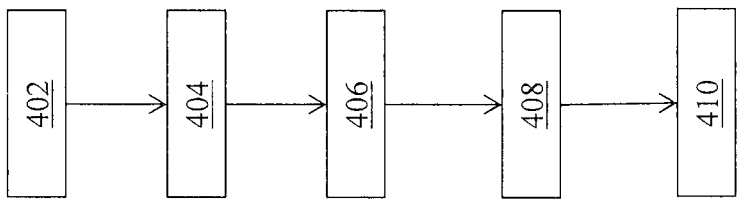
FIG. 4 shows a flowchart illustrating a method for determining a distance between two radar systems in an embodiment.

FIG. 4 shows a flowchart 400 illustrating a method for calibrating two radar systems in an embodiment by determining a distance between the radar systems. In Box 402, a target reflector 210 is moved along a track 212 to a location at which a direct range measurement obtained from the target reflector 210 using the first radar system 202 is equal to a direct range measurement obtained from the target reflector 210 using the second radar system 204. In Box 404, a first bistatic range measurement is obtained by transmitting a radar signal from the first radar system 202 and receiving the reflection of the radar signal from the target reflector 210 at the second radar system 204. In Box 406, a second bistatic range measurement is obtained by transmitting a radar signal from the second radar system and receiving the reflection of the radar signal from the target reflector at the first radar system. In Box 408 the first bistatic range measurement is compared to the second bistatic range measurement to determine that these measurements are equal to each other. In Box 410, the length d of the baseline is calculated from $R_1$, $R_2$ and selected radial length r using Eqs. (1)-(3).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of measuring a distance between a first radar system disposed on a vehicle and a second radar system disposed on the vehicle, comprising:
   moving a target reflector along a track to a location along a perpendicular bisector of a baseline connecting the first radar system and the second radar system;
   obtaining a direct range measurement for at least one of the first radar system and the second radar system and a bistatic range measurement between the first radar system and the second radar system; and
   determining the distance between the first radar system and the second radar system using the direct range measurement, the bistatic range measurement and a radial length of the target reflector.

2. The method of claim 1, further comprising determining a radar measurement of an object based on the determined distance between the radar system and the second system.

3. The method of claim 2, further comprising maneuvering the vehicle with respect to the object for the determined radar measurement.

4. The method of claim 1, wherein moving the target reflector to the location along the perpendicular bisector further comprises moving the target reflector to the location at which a first direct range measurement between the first radar system and the target reflector is equal to or substantially equal to a second direct range measurement between the second radar system and the target reflector.

5. The method of claim 1, wherein the target reflector is a spherical reflector and the radial length is a radius of the spherical reflector.

6. The method of claim 1, wherein the target reflector is a reflective surface extended from the track by a radial element and the radial length is a length of the radial element.

7. The method of claim 6, further comprising obtaining the direct range measurement with the reflective surface is at one angular position and obtaining the bistatic range measurement with the reflective surface is at another angular position.

8. The method of claim 1, wherein the first radar system and the second radar system are out of a line-of-sight of each other.

9. An apparatus for determining a distance between a first radar system disposed on a vehicle and a second radar system disposed on the vehicle, comprising:
   a track that is disposed parallel to a baseline of the first radar system and the second radar system and intercepts a perpendicular bisector of the baseline;
   a target reflector that moves along the track; and
   a processor coupled to the first radar system and the second radar system, the processor configured to:
      obtain a direct range measurement for at least one of the first radar system and the second radar system and a bistatic range measurement between the first radar system and the second radar system when the target reflector is located at an intersection of the perpendicular bisector and the track, and
      determine the distance between the first radar system and the second radar system using the direct range measurement, the bistatic range measurement and a radial length of the target reflector.

10. The apparatus of claim 9, wherein the processor determines a radar measurement of an object based on the determined distance between the radar system and the second system.

11. The apparatus of claim 10, further comprising maneuvering the vehicle with respect to the object for the determined radar measurement.

12. The apparatus of claim 9, wherein the target reflector is a spherical reflector and the radial length is a radius of the spherical reflector.

13. The apparatus of claim 9, wherein the target reflector is a reflective surface extended from a swivel point on the track by a radial element and the radial length is a length of the radial element.

14. The apparatus of claim 13, wherein the reflective surface is at one angular position to obtain the direct range measurement and at another angular location to obtain the bistatic range measurement.

15. A method of measuring a distance between a first radar system disposed on a vehicle and a second radar system disposed on the vehicle, comprising:
   disposing a track parallel to a baseline connecting the first radar system and the second radar system;
   moving a target reflector along the track to a selected location at which the target reflector intersects the perpendicular bisector of a baseline;
   obtaining a direct range measurement for at least one of the first radar system and the second radar system and a bistatic range measurement between the first radar system and the second radar system; and
   determining the distance between the first radar system and the second radar system using the direct range measurement, the bistatic range measurement and a radial length of the target reflector.

16. The method of claim 15, wherein moving the target reflector to the selected location further comprises determining the location at which a first direct range measurement between the first radar system and the target reflector is equal to or substantially equal to a second direct range measurement between the second radar system and the target reflector.

17. The method of claim 15, wherein the target reflector is a spherical reflector and the radial length is a radius of the spherical reflector.

18. The method of claim 15, wherein the target reflector is a reflective surface extended from a swivel point by a radial element and the radial length is a length of the radial element.

19. The method of claim 18, further comprising obtaining the direct range measurement with the reflective surface is at one angular position and obtaining the bistatic range measurement with the reflective surface is at another angular position.

20. The method of claim 15, wherein the first radar system and the second radar system are out of a line-of-sight of each other.

* * * * *